US012187130B2

(12) United States Patent
Kadota et al.

(10) Patent No.: US 12,187,130 B2
(45) Date of Patent: Jan. 7, 2025

(54) ELECTRIC VEHICLE

(71) Applicant: Hitachi Construction Machinery Co., Ltd., Tokyo (JP)

(72) Inventors: Mitsuhiro Kadota, Tokyo (JP); Masatsugu Arai, Tokyo (JP); Atsushi Kitaguchi, Tokyo (JP); Naoki Fukuda, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 369 days.

(21) Appl. No.: 17/625,795

(22) PCT Filed: Jul. 7, 2020

(86) PCT No.: PCT/JP2020/026526
§ 371 (c)(1),
(2) Date: Jan. 10, 2022

(87) PCT Pub. No.: WO2021/014961
PCT Pub. Date: Jan. 28, 2021

(65) Prior Publication Data
US 2022/0258593 A1 Aug. 18, 2022

(30) Foreign Application Priority Data
Jul. 25, 2019 (JP) .................. 2019-137191

(51) Int. Cl.
B60K 6/46 (2007.10)
B60W 10/08 (2006.01)
(Continued)

(52) U.S. Cl.
CPC ............. B60K 6/46 (2013.01); B60W 10/08 (2013.01); B60W 10/26 (2013.01); B60W 20/15 (2016.01);
(Continued)

(58) Field of Classification Search
CPC ......... B60K 6/46; B60W 10/08; B60W 10/26; B60W 20/15; H02J 7/0068; H02J 7/143;
(Continued)

(56) References Cited

U.S. PATENT DOCUMENTS

2004/0021441 A1   2/2004   Komiyama et al.
2012/0187919 A1   7/2012   Andersson et al.
(Continued)

FOREIGN PATENT DOCUMENTS

EP   3 235 670 A1   10/2017
JP   6-70198 U       9/1994
(Continued)

OTHER PUBLICATIONS

Chinese-language Office Action issued in Chinese Application No. 202080037250.6 dated Sep. 4, 2023 with partial English translation (11 pages).
(Continued)

Primary Examiner — Yi-Kai Wang
(74) Attorney, Agent, or Firm — Crowell & Moring LLP

(57) ABSTRACT

To provide an electric vehicle capable of reducing heat generation of the switching elements while achieving energy saving, the electric vehicle includes: an engine 11; a first generator 12 driven by the engine; a first rectifier circuit 14 connected to the output of the first generator; a first DC line 16 to receive the DC output of the first rectifier circuit; a driving motor 10 connected to the first DC line; a power converter 20 configured to convert voltage of the first DC line; a second DC line 34 to receive the DC output subjected to voltage conversion by the power converter; an auxiliary device 33 connected to the second DC line; and a controller 40 configured to control the power converter. The controller is configured to, in response to the voltage $V_i$ of the first DC line becoming equal to or less than a first threshold $V_c$,
(Continued)

control the output power $P_o$ of the power converter to a rated power $P_1$, and in response to the voltage becoming larger than the first threshold, control the output power $P_o$ to be smaller than the rated power.

5 Claims, 14 Drawing Sheets

(51) Int. Cl.
  *B60W 10/26* (2006.01)
  *B60W 20/15* (2016.01)
  *H02J 7/00* (2006.01)
  *H02M 3/335* (2006.01)

(52) U.S. Cl.
  CPC ....... *H02J 7/0068* (2013.01); *H02M 3/33573* (2021.05)

(58) Field of Classification Search
  CPC .... H02J 2310/48; H02J 7/1438; H02J 7/1492; H02M 3/33573; H02M 1/0025; H02M 1/10; H02M 1/322; H02M 1/327; H02M 3/00; H02M 3/33569; B60L 1/003; B60L 3/003; B60L 3/04; B60L 7/14; B60L 7/16; B60L 7/22; B60L 50/15; B60L 2200/40; B60L 50/13; B60L 50/61; B60L 2200/36; B60L 2210/10; B60L 2210/30; B60L 2210/40; B60L 2240/34; B60L 2240/421; B60L 2240/461; B60L 2240/525; B60L 15/2009; B60L 15/2045; Y02T 10/92
  USPC .................................................. 180/65.245
  See application file for complete search history.

(56) References Cited

U.S. PATENT DOCUMENTS

| | | | |
|---|---|---|---|
| 2017/0282894 A1* | 10/2017 | Kamachi | ............... B60W 20/40 |
| 2018/0272871 A1* | 9/2018 | Takada | ..................... B60K 6/46 |
| 2020/0180588 A1 | 6/2020 | Tanaka et al. | |

FOREIGN PATENT DOCUMENTS

| | | |
|---|---|---|
| JP | 2002-330554 A | 11/2002 |
| JP | 2010-74913 A | 4/2010 |
| JP | 2010-98888 A | 4/2010 |
| JP | 2017-127090 A | 7/2017 |
| JP | 2019-64450 A | 4/2019 |
| WO | WO 2019/064703 A1 | 4/2019 |

OTHER PUBLICATIONS

English translation (JP 2010-98888 A filed on Jan. 10, 2022) (40 pages).
Extended European Search Report issued in European Application No. 20843073.6 dated Aug. 14, 2023 (16 pages).
International Search Report (PCT/ISA/210) issued in PCT Application No. PCT/JP2020/026526 dated Aug. 11, 2020 with English translation (five (5) pages).
Japanese-language Written Opinion (PCT/ISA/237) issued in PCT Application No. PCT/JP2020/026526 dated Aug. 11, 2020 (three (3) pages).

* cited by examiner

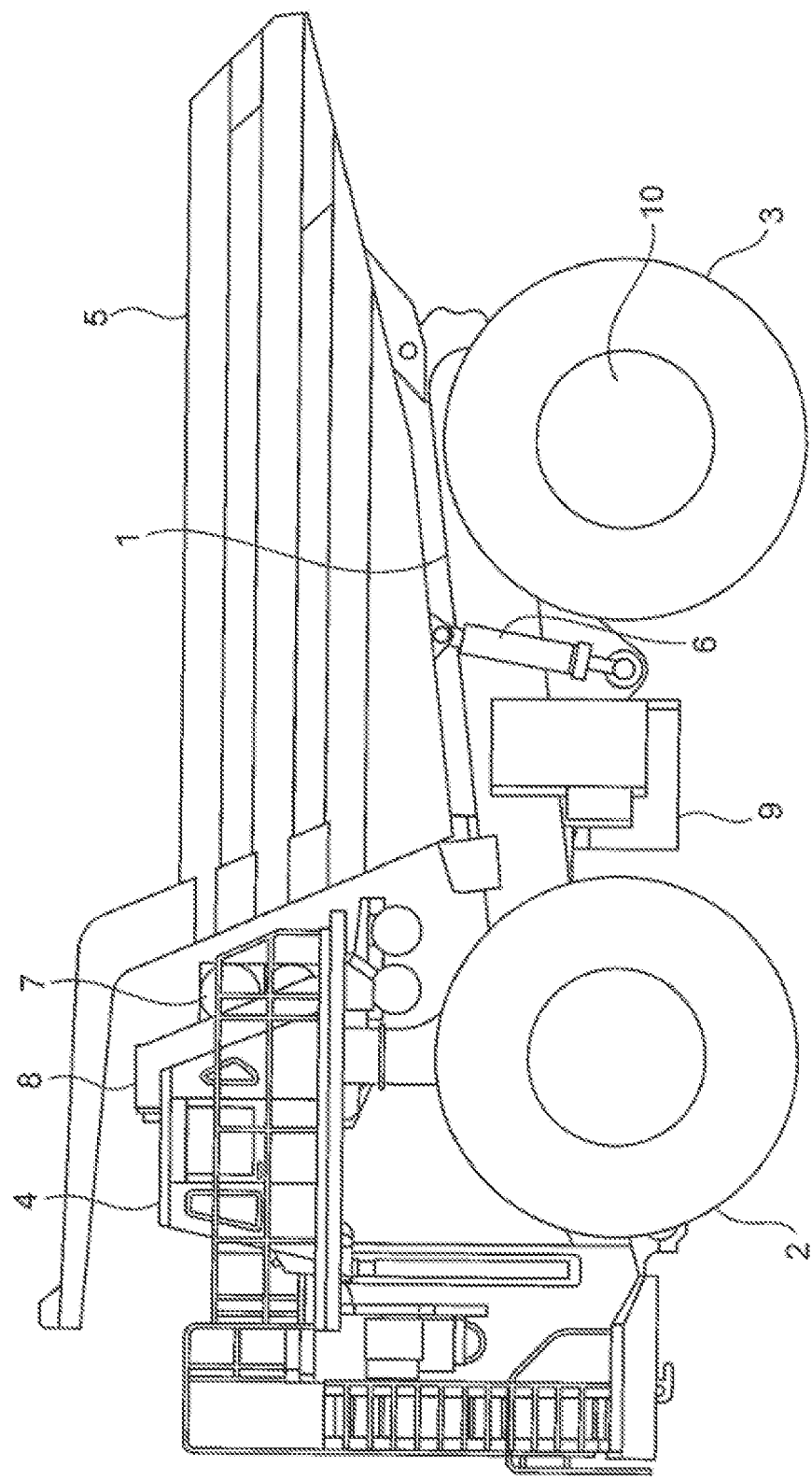

ELECTRIC VEHICLE

TECHNICAL FIELD

The present invention relates to electric vehicles.

BACKGROUND ART

Due to the depletion of fossil fuels and the worsening of global environmental problems, motor-driven vehicles such as hybrid vehicles and electric vehicles are becoming widespread. Electric drive systems may also be used in large work vehicles such as transport dump trucks and wheel loaders at mining sites. Some of these large work vehicles drive the traveling motor using the electric power from the generator driven by the engine.

For large work vehicles that use the electric drive system, energy saving and fuel consumption reduction can be realized by installing a system that supplies the regenerative power generated by the driving motor to auxiliary devices and a power storage device during retard (braking). The following refers to such a system as a regenerative braking system. The regenerative braking system requires a DC/DC converter that converts the voltage of a DC line to which the driving motor inverter is connected (hereinafter called a main DC line) and outputs the voltage into a DC line to which an auxiliary device is connected (hereinafter called an auxiliary DC line). In the following, this converter will be referred to as a power converter.

Patent Literature 1 describes the configuration of a DC/DC converter connecting the main system and the auxiliary device system of an electric drive system of a hybrid vehicle or an electric vehicle. This configuration can be applied to large work vehicles about the regenerative braking system and the power converter described above.

CITATION LIST

Patent Literature

Patent Literature 1: JP 2010-74913 A

SUMMARY OF INVENTION

Technical Problem

A large electric vehicle such as a dump truck has the voltage of the main DC line that fluctuates greatly depending on the operating condition. Therefore, the power converter (DC/DC converter) needs to handle the fluctuations in input voltage. One of the problems to handle these fluctuations in input voltage is that the switching loss of switching elements that make up the power converter increases with the input voltage, which generates heat more.

In view of the above problems, the present invention aims to provide an electric vehicle capable of reducing heat generation of the switching elements while achieving energy saving.

Solution to Problem

An electric vehicle according to one aspect of the present invention includes: an engine; a first generator driven by the engine; a first rectifier circuit connected to the output of the first generator; a first DC line to receive the DC output of the first rectifier circuit; a driving motor connected to the first DC line; a power converter configured to convert voltage of the first DC line; a second DC line to receive the DC output subjected to voltage conversion by the power converter; an auxiliary device connected to the second DC line; and a controller configured to control the power converter. In response to the voltage of the first DC line becoming equal to or less than a first threshold, the controller controls output power of the power converter to a preset rated power. In response to the voltage of the first DC line becoming larger than the first threshold, the controller controls output power of the power converter to be smaller than the rated power.

Advantageous Effects of Invention

The present invention reduces heat generation of the switching elements of an electric vehicle while achieving the energy saving. Further features of the present invention will be clear from the following descriptions and the attached drawings. Other problems, configurations and advantageous effects also will be clear from the following descriptions of the embodiments.

BRIEF DESCRIPTION OF DRAWINGS

FIG. 14 describes the configuration of a dump truck.

DESCRIPTION OF EMBODIMENTS

The following describes electric vehicles according to some embodiments of the present invention, with reference to the attached drawings. Like numbers indicate like components throughout the drawings, and their duplicated descriptions are omitted. The present invention is not limited to the following embodiments, and includes various modifications and applications within the technical concept of the present invention.

Embodiment 1

(Hardware Configuration of Electric Drive System)

Figure 1:
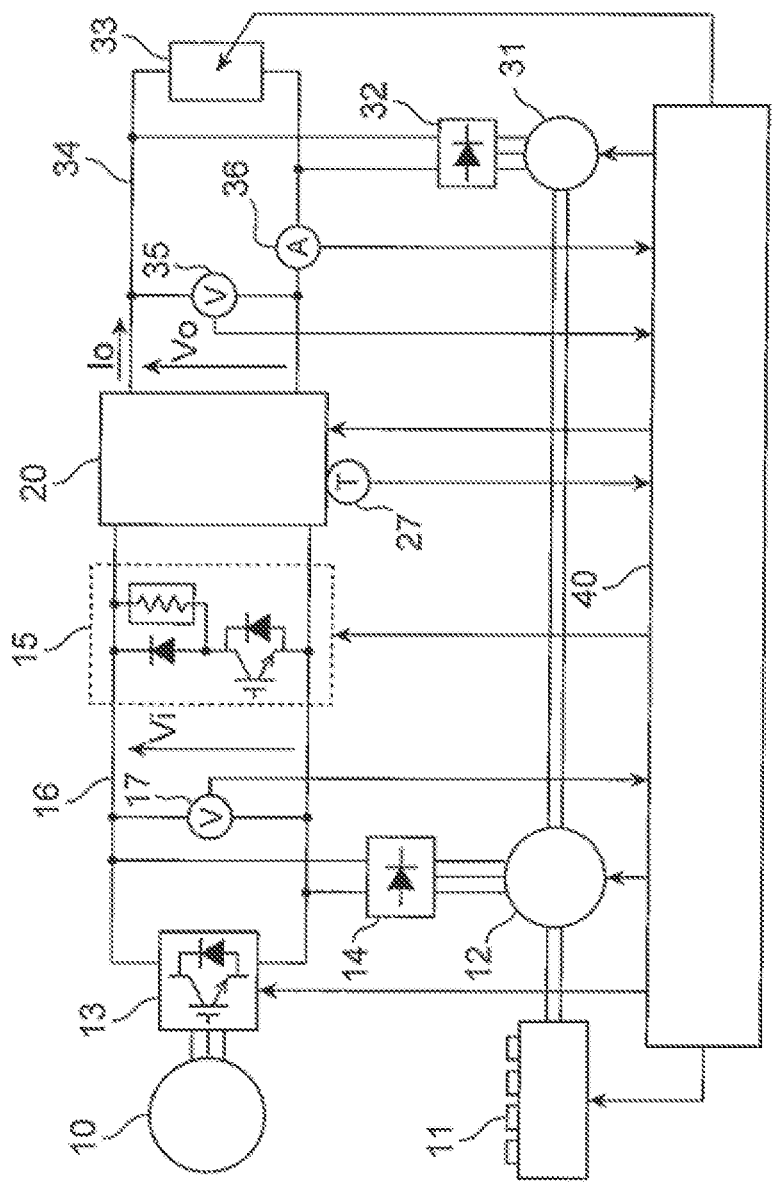
FIG. 1 shows a hardware configuration of an electric drive system of an electric vehicle according to Embodiments 1 and 2.

Referring to FIG. 1, the following describes a hardware configuration of the electric drive system. The configuration of FIG. 1 is used for Embodiments 1 and 2 of the present invention.

The electric drive system is used for an electric work vehicle such as a large dump truck or a wheel loader. The electric drive system includes: a main generator (first generator) 12 and an auxiliary generator (second generator) 31 that are driven by an engine 11; a driving motor 10 driven with the power that the main generator 12 generates; a power convertor 20 that converts the voltage of the regenerative power of the driving motor 10 during vehicle braking to a lower voltage; and an auxiliary device 33 driven by receiving the supply of at least one of the power that the auxiliary generator 31 generates and the power having the voltage that the power converter 20 converts.

The main generator (first generator) 12 and the auxiliary generator (second generator) 31 are connected to the engine 11 and are driven by the engine 11. The main generator 12 outputs AC power, which is input to a main rectifier circuit (first rectifier circuit) 14. The main rectifier circuit 14 rectifies the input AC power into DC power. The main generator 14 outputs the DC power to a main DC line (first DC line) 16. The main DC voltage $V_i$ (first DC voltage) is a voltage in the main DC line 16 and is detected by a voltage detector 17. The DC input of the driving motor inverter (first inverter) 13 is output to the main DC line 16.

The AC output of the inverter 13 is input to the driving motor 10. The driving motor 10 drives the wheels of the electric vehicle (not shown) to move the electric vehicle forward or backward. In addition to the main rectifier circuit 14 and the inverter 13, a power consumption device 15 and the voltage detector 17 are connected to the main DC line 16. The power consumption device 15 has a configuration including a resistor connected to a chopper circuit made up of a switching element and a diode, and converts the regenerative energy of the driving motor 10 into heat to exchange the heat with the atmosphere.

FIG. 1 shows an insulated gate bipolar transistor (IGBT) as an example of the switching element (hereinafter this may be simply called an "element") of the inverter 13 and the power consumption device 15, and describes the circuit symbol of the IGBT. The switching elements are not limited to IGBTs, which may be power semiconductor devices or power semiconductors, including other types of elements, such as metal-oxide-semiconductor field effect transistors (MOSFETs), bipolar transistors, and thyristors. An AC/DC converter including a switching element may be used as the main rectifier circuit 14. Although omitted in FIG. 1, a protective device, such as a smoothing capacitor and its discharge resistor or a surge protector, may be connected to the main DC line 16.

The auxiliary generator 31 outputs AC power, which is input to an auxiliary rectifier circuit (second rectifier circuit) 32. The auxiliary rectifier circuit 32 rectifies the input AC power into DC power. The auxiliary rectifier circuit 32 outputs the DC power to an auxiliary DC line (second DC line) 34. The auxiliary DC voltage Vo (second DC voltage) is in the auxiliary DC line 34 and is detected by a voltage detector 35. The auxiliary device 33 is connected to the auxiliary DC line 34. The auxiliary device 33 makes up the electrical load of the electric drive system.

Examples of the auxiliary device 33 include an inverter and a compressor motor system for air conditioner and an inverter and a blower motor system for device cooling. FIG. 1 combines them into one equivalent impedance and describes it as the auxiliary device 33. The power consumption of the auxiliary device 33 can be controlled by a controller as described later. In addition to the auxiliary rectifier circuit 32 and the auxiliary device 33, the voltage detector 35 and a current detector 36 are connected to the auxiliary DC line 34. The function of the current detector 36 will be described later. Although omitted in FIG. 1, a protective device, such as a smoothing capacitor and its discharge resistor or a surge protector, may be connected to the auxiliary DC line 34.

The power converter 20 includes a DC/DC converter, and converts the main DC voltage $V_i$ into the auxiliary DC voltage $V_o$ as described later. The power converter 20 has the input unit connected to the main DC line 16 and the output unit connected to the auxiliary DC line 34. The current detector 36 described above detects the output current $I_o$ of the power converter 20. A temperature detector 27 detects temperature $T_o$ of the power converter 20. This temperature $T_o$ may be the ambient temperature of the power converter 20 or the temperature of a specific component of the power converter 20. The temperature detector 27 therefore may be mounted around the power converter 20 or built into the power converter 20. Note here that, in Embodiment 1, the temperature value detected by the temperature detector 27 is not used, but is used in Embodiment 2 described later. The electric drive system may include a temperature detector for other devices, such as the inverter 13.

The controller 40 acquires information on the main DC voltage $V_i$ from the voltage detector 17, acquires information on the auxiliary DC voltage $V_o$ from the voltage detector 35, acquires information on the output current $I_o$ from the current detector 36, and acquires information on $T_o$ from the temperature detector 27. Although omitted in FIG. 1, the controller 40 may acquire other information such as the AC output current of the inverter 13, the rotation speed of the driving motor 10, and the speed of the electric vehicle. The controller 40 outputs a control signal to each of the above-mentioned devices based on the information of these detection results and the input from the operator, and controls the energy flow in the electric drive system.

FIG. 1 shows control signals from the controller 40 to the engine 11, the main generator 12, the inverter 13, the power consumption device 15, the power converter 20, the auxiliary generator 31 and the auxiliary device 33. Assume that the main generator 12 and the auxiliary generator 31 each have a built-in actuator such as an exciter. That is, in response to the output of a voltage command value as a control signal from the controller 40, the output voltages of these generators 12 and 31 are controlled according to the voltage command value. In FIG. 1, the control signal from the controller 40 to the power converter 20 is indicated with a single arrow. In another example, the power converter 20 may include a plurality of elements. In that case, the signal also may be a plurality of control signals.

(Energy Flow of Electric Drive System and Regenerative Braking System)

First, the energy flow of the electric drive system during acceleration will be described. When the main generator 12 is driven by the engine 11, the AC voltage output from the main generator 12 is converted into the main DC voltage $V_i$ by the main rectifier circuit 14, and is input to the inverter 13. In response to depressing of the accelerator pedal by the operator, AC power is supplied from the inverter 13 to the driving motor 10, so that the driving motor 10 drives the wheels to accelerate the vehicle body. In this case, the main DC voltage $V_i$ is controlled by the main generator 12.

Next, the energy flow of the electric drive system during braking will be described. In response to depressing of the brake pedal by the operator, the driving motor 10 converts the kinetic energy of the vehicle body into electrical energy and outputs regenerative power to the main DC line 16 via the inverter 13. That is, the driving motor 10 operates as a generator. The power consumption device 15 converts the regenerated power into heat energy and thus prevents the main DC voltage $V_i$ from becoming too large. Therefore, the main DC voltage $V_i$ in this case is controlled by the power consumption device 15.

The power converter 20 converts the main DC voltage $V_i$ into the auxiliary DC voltage $V_o$, and supplies a part of the regenerative power to the auxiliary device 33. As the power consumption device 15 and the auxiliary device 33 consume the regenerative power, the vehicle body decelerates. A mechanical brake (not shown) may be used in combination.

The energy flow of the auxiliary system will be described. In response to driving of the auxiliary generator 31 by the engine 11, the AC voltage output from the auxiliary generator 31 is converted into the auxiliary DC voltage $V_o$ by the auxiliary rectifier circuit 32, and is input to the auxiliary device 33. This means that the auxiliary DC voltage $V_o$ is controlled by the auxiliary generator 31. During braking, the power converter 20 supplies power to the auxiliary device 33, which reduces the load on the auxiliary generator 31 and thus on the engine 11. Such an operation enables effective use of the regenerative power generated during braking by the auxiliary device, and accordingly achieves energy saving and reduces fuel consumption of the electric vehicle. This is the regenerative braking system in the present embodiment.

(Input Voltage Fluctuations of Power Converter)

As described above, the main generator 12 controls the main DC voltage $V_i$ during acceleration, and the power consumption device 15 controls the main DC voltage $V_i$ during braking. Note here that a heavy electric vehicle such as a dump truck has the devices of the electric drive system that have a large capacity and a high voltage. When the rotation speed of the driving motor 10 is high, the amplitude of the AC voltage to be supplied to the driving motor 10 by the inverter 13 becomes large. In this case, it is necessary to set the main DC voltage $V_i$ to a high voltage in the order of kV. Also for the case where the amount of the accelerator pedal depressed by the operator is large and the torque of the driving motor 10 is large, it is necessary to set the main DC voltage $V_i$ to a high voltage and suppress the current in the main DC line 16.

In contrast, when the driving motor 10 stops or is rotating at a low speed during starting, the inverter 13 does not need to supply a high voltage to the driving motor 10. In such a case, the main DC voltage $V_i$ is reduced to decrease the loss of the inverter 13. For these reasons, the main DC voltage $V_i$ fluctuates over a wide range, depending on the speed of the electric vehicle and the amount of depressing of the accelerator pedal. The main DC voltage $V_i$ is also the input voltage of the power converter 20. The power converter 20 therefore has to respond to the fluctuations in the input voltage. The following defines the fluctuation range of the main DC voltage $V_i$ as $V_1$ to $V_2$.

(Examples of Configuration of Power Converter)

Figure 2:
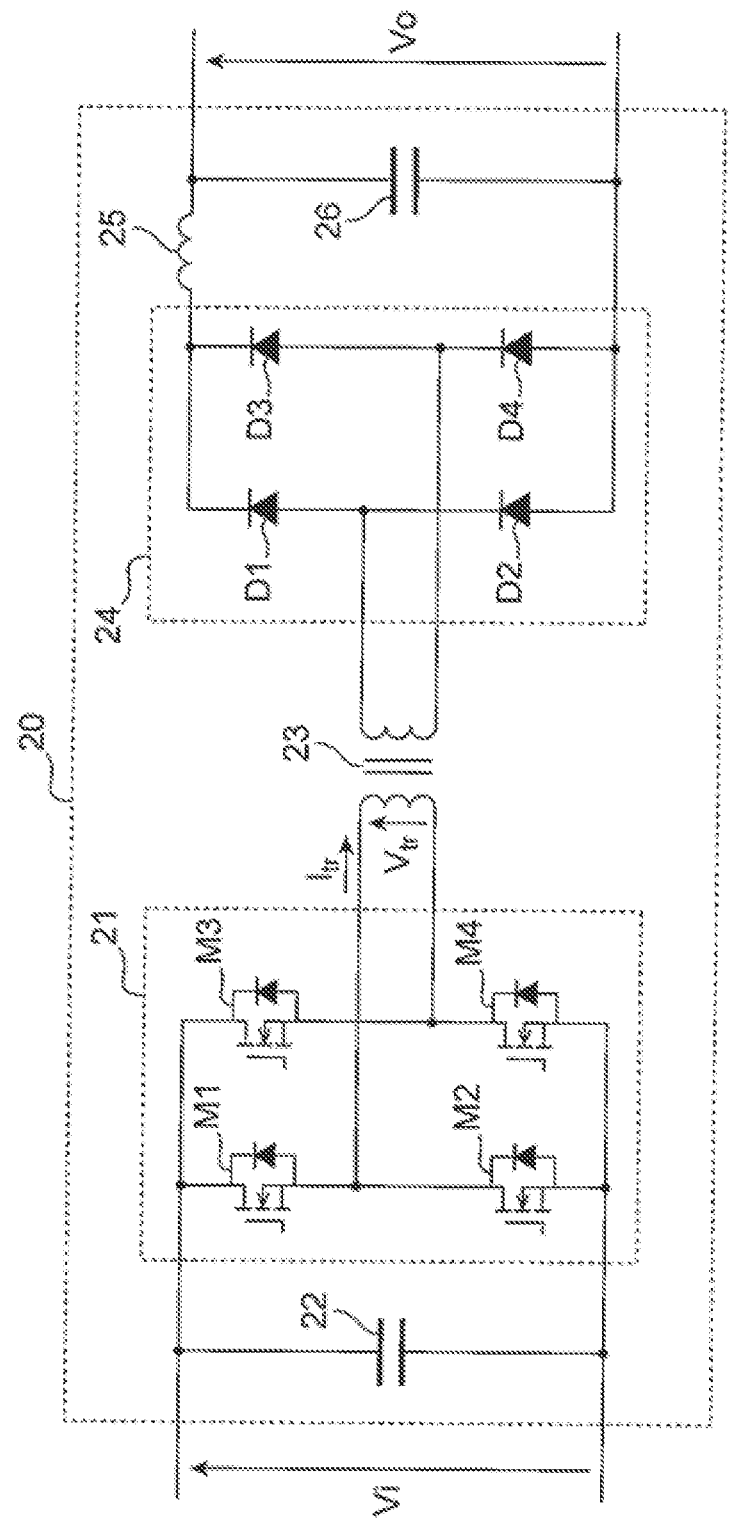
FIG. 2 shows an example of the configuration of a power converter.

FIG. 2 shows an example of the configuration of the power converter 20. The power converter 20 has an input terminal that is connected to an inverter 21 (second inverter) and a capacitor 22. FIG. 2 shows a full-bridge inverter circuit including four elements ($M_1$ to $M_4$) as the circuit configuration of the inverter 21, which may have other circuit configurations. The AC output terminal of the inverter 21 is connected to the primary winding of a transformer 23. The secondary winding of the transformer 23 is connected to an AC input terminal of a rectifier circuit 24 (third rectifier circuit). FIG. 2 shows a full-bridge rectifier circuit including four diodes ($D_1$ to $D_4$) as the circuit configuration of the rectifier circuit 24, which may have other circuit configurations. The DC output terminal of the rectifier circuit 24 is connected to the output terminal of the power converter 20 via a filter circuit including a choke coil 25 and a capacitor 26.

The inverter 21 converts the main DC voltage $V_i$ input to the power converter 20 into AC voltage $V_{tr}$ and applies it to the primary winding of the transformer 23. The AC current flowing through the primary winding of the transformer 23 is defined as the primary winding current $I_{tr}$. The transformer 23 transforms the voltage applied to the primary winding to generate AC voltage in the secondary winding, while insulating between the input and output of the power converter 20. This AC voltage is converted to DC voltage by the rectifier circuit 24 and is output from the power converter 20 through the filter circuit.

FIG. 2 shows MOSFETs as the elements $M_1$ to $M_4$, which may be power semiconductor devices or power semiconductors, including other types of devices such as IGBTs. In addition to the above devices, the power converter 20 may also include control components such as breakers and relays, protective components such as fuses and surge protectors, and noise filters.

(Operating Waveforms and Problems Due to Voltage Fluctuations of Power Converters in Conventional Regenerative Braking Systems)

Figure 3:
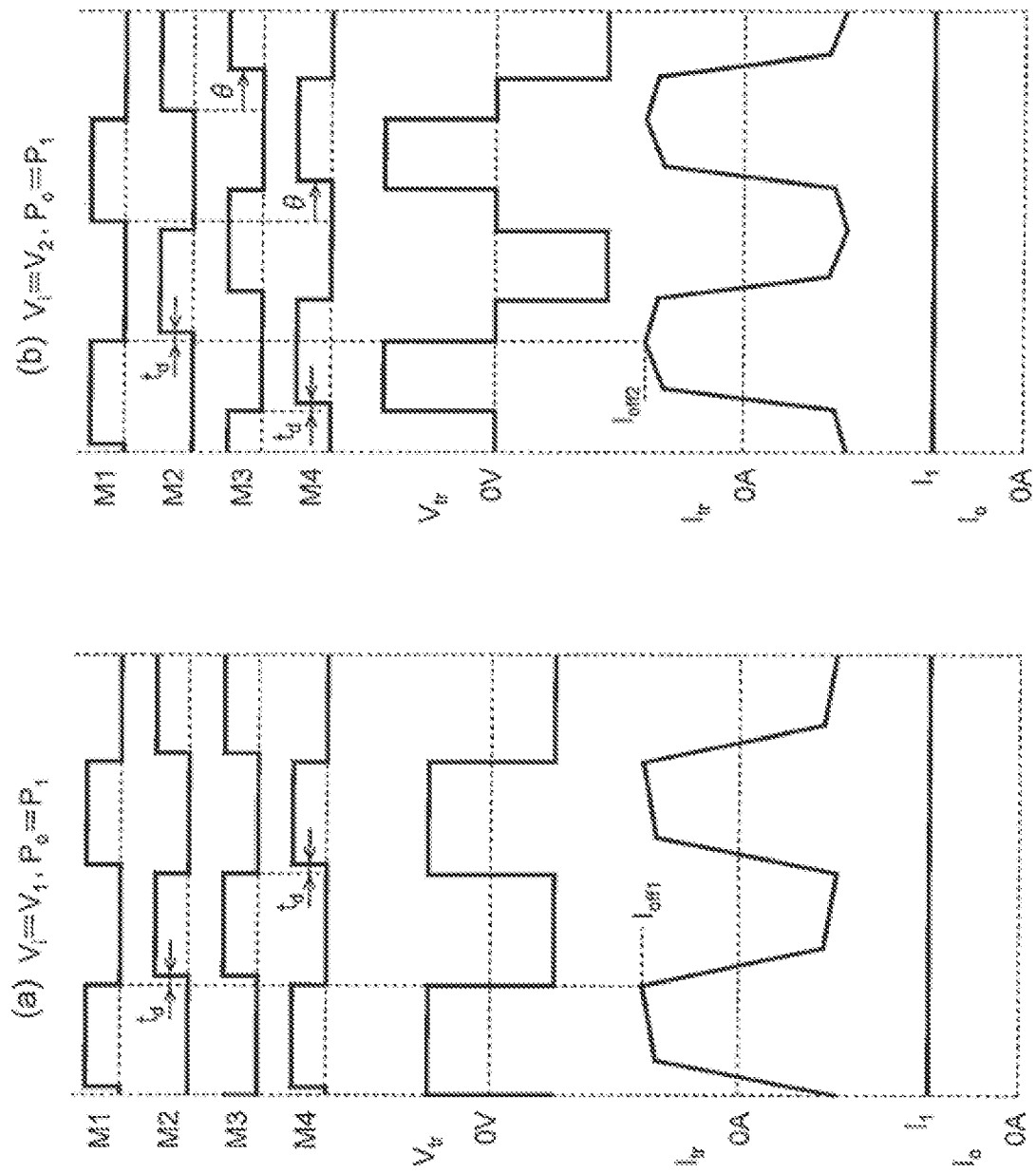
FIG. 3 describes operating waveforms showing the basic operation of a power converter and conventional problems.

FIG. 3 shows the operating waveforms of a power converter 20 in a conventional regenerative braking system. Referring to FIG. 3, the basic operation of the power converter 20 and the specific problems of the fluctuations of the main DC voltage $V_i$ will be explained. The power converter 20 converts power with switching operations of elements $M_1$ to $M_4$, and FIG. 3 shows operating waveforms for two switching cycles. The vertical axis in FIG. 3 represents the drive signals (on/off signals) of the elements $M_1$ to $M_4$, the primary winding voltage $V_{tr}$ of the transformer 23, the primary winding current $I_{tr}$ of the transformer 23, and the output current $I_o$ of the power converter 20.

FIG. 3(a) assumes that the main DC voltage $V_i$ is the minimum value $V_1$, and FIG. 3(b) assumes that the main DC voltage $V_i$ is the maximum value $V_2$. Both FIGS. 3(a) and 3(b) assume that the output power $P_o$ of the power converter 20 is controlled to the rated value (rated power) $P_1$. The auxiliary DC voltage $V_o$ is controlled to be constant by the auxiliary generator 31, independent of the main DC voltage $V_i$. Therefore, the output currents $I_o$ are the same in FIGS. 3 (a) and 3(b), and the value is set to $I_1$ (=$P_1/V_o$).

FIG. 3 assumes phase shift control that is used as the specific control method for the inverter 21 (full bridge inverter circuit). The phase shift control enables soft switching of the turn-on of $M_1$ to $M_4$, so that the turn-on loss can be made almost zero. Since the phase shift control is a known technology, the detailed explanations of the operation mode and current path will be omitted, and the following mainly describes the outline of the operation and the effect of fluctuations of the main DC voltage $V_i$.

As shown in FIG. 3, the elements $M_1$ and $M_2$ on the left leg of FIG. 2 are complementarily controlled on/off with a dead time $t_d$ in between. The same applies to the elements $M_3$ and $M_4$ on the right leg of FIG. 2. As can be seen from FIG. 3(b), the inverter 21 delays the switching of the element $M_4$ by the shift amount θ as compared with the element $M_1$ and similarly delays the switching of the element $M_3$ by the shift amount θ as compared with the element $M_2$. The inverter 21 changes the shift amount θ to control the output of the power converter 20. If the output of the power converter 20 is kept under the same condition, the shift amount θ increases with the main DC voltage $V_i$. Under the condition that the main DC voltage $V_i$ is minimized as shown in FIG. 3(a), the turns ratio of the transformer 23 is desirably designed so that the shift amount θ becomes almost zero. In this case, the elements $M_1$ and $M_4$ and the elements $M_2$ and $M_3$ switch at almost the same time.

The primary winding voltage $V_{tr}$ of the transformer 23 becomes a rectangular pulse voltage, and has the amplitude almost equal to the main DC voltage $V_i$. As can be seen from FIG. 3(b), the phase shift operation (generation of θ) generates a period in which the primary winding voltage $V_{tr}$ becomes zero. During this period, power is not transmitted from the primary side to the secondary side of the transformer 23. The shift amount θ increases with the main DC voltage $V_i$, so that although the amplitude of the primary winding voltage $V_{tr}$ increases, the period during which the primary winding voltage $V_{tr}$ becomes zero also increases.

The primary winding current $I_{tr}$ is also the current flowing through the inverter 21. The amplitude of the primary winding current $I_{tr}$ mainly depends on the output current $I_o$ and the turns ratio of the transformer 23, and is almost independent of the main DC voltage $V_i$. FIGS. 3(a) and 3(b) show the turn-off currents $I_{off1}$, and $I_{off2}$ of the element $M_1$, and the turn-off currents $I_{off1}$ and $I_{off2}$ also hardly depend on the main DC voltage $V_i$.

In the case shown in FIG. 3(a), almost the same voltage as the main DC voltage $V_i$ is applied to the element $M_1$ until just before the element $M_1$ turns off. This means that, as the main DC voltage $V_i$ increases, the turn-off loss of the element $M_1$ and the resulting heat generated by the element $M_1$ increase. The same applies to the elements $M_2$ to $M_4$. In this way, the conventional regenerative braking system has a specific problem due to the fluctuations of the main DC voltage $V_i$, that is, heat generation of the elements in the power converter 20 increases with the main DC voltage $V_i$. This problem of heat generation of the elements under conditions with a large main DC voltage $V_i$ will occur even when a different circuit or control method from those described above is used for the power converter 20.

(Block Diagram of Controller)

Figure 4:
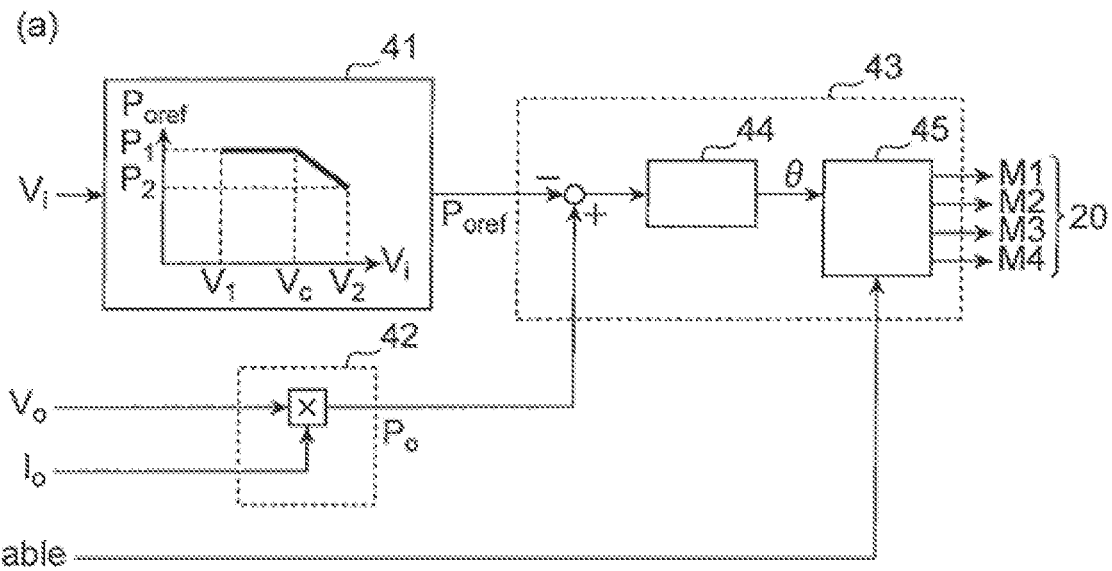
FIGS. 4A-4D are a block diagram showing the part of the controller in Embodiment 1 that controls the power converter.
Figure 4:
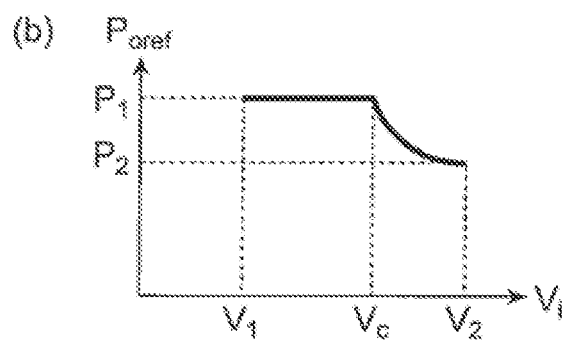
Figure 4:
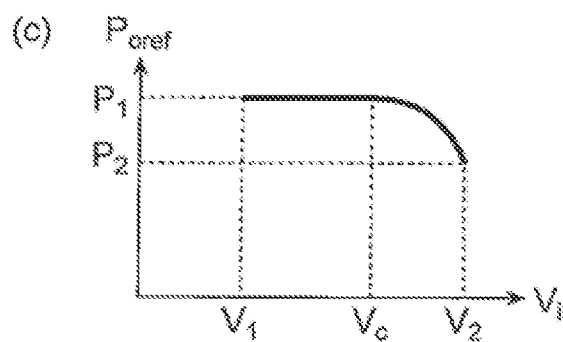
Figure 4:
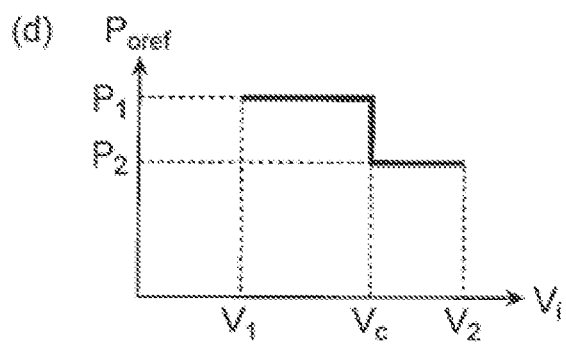

To solve the above-mentioned problem, the regenerative braking system of the present embodiment is configured to, when the main DC voltage $V_i$ is larger than a predetermined threshold (first threshold), reduce the output power $P_o$ of the power converter 20 than when the main DC voltage $V_i$ is equal to or less than the predetermined threshold. As described above, the controller 40 in FIG. 1 controls various devices of the electric drive system shown in the drawing. FIG. 4 is a block diagram showing the part of the system that controls the power converter 20. The controller 40 includes an output power table 41, an output power calculation unit 42, and a control calculation unit 43.

The output power table 41 refers to the table according to the input main DC voltage $V_i$, and outputs a command value $P_{oref}$ of the output power. Assume that the predetermined threshold is $V_c$ ($V_1 \leq V_c \leq V_2$). Then when the main DC voltage $V_i$ is equal to or less than the threshold $V_c$ ($V_i \leq V_c$), the output power command value $P_{oref}$ is set at the rated output power $P_1$. When the main DC voltage $V_i$ is larger than the threshold $V_c$ ($V_i > V_c$), the output power command value $P_{oref}$ is set smaller than the rated value $P_1$.

As long as the output power command value $P_{oref}$ is smaller than the rated value $P_1$ ($P_{oref} < P_1$), the main DC voltage $V_i$ and the output power command value $P_{oref}$ may have any specific relationship. FIG. 4(a) shows an example where the output power command value $P_{oref}$ is a linear function of the main DC voltage $V_i$ so that the output power command value $P_{oref}$ when the main DC voltage $V_i$ is the maximum value $V_2$ is set to the lower limit $P_2$. In the following, the region where the main DC voltage $V_i$ is larger than the threshold $V_c$ and the output power command value $P_{oref}$ is smaller than the rated value $P_1$, that is, $V_i > V_c$ and $P_{oref} < P_1$, is defined as an output reduction region.

FIG. 4(a) shows the case where the main DC voltage $V_i$ and the output power command value $P_{oref}$ have a relationship of a linear function such that the output power command value $P_{oref}$ decreases from the rated value $P_1$ by a certain ratio with an increase of the main DC voltage $V_i$ from the threshold $V_c$. The relationship between the main DC voltage $V_i$ and the output power command value $P_{oref}$ when the main DC voltage $V_i$ is larger than the threshold $V_c$ ($V_i > V_c$) is not limited to the linear function relationship shown in FIG. 4(a). The relationship may be such that the output power command value $P_{oref}$ is smaller than the rated value $P_1$ ($P_{oref} < P_1$) when the main DC voltage $V_i$ is larger than the threshold $V_c$ ($V_i > V_c$).

The output power calculation unit 42 calculates the output power $P_o$ ($= V_o I_o$) from the auxiliary DC voltage $V_o$ and the output current $I_o$ of the power converter 20. The control calculation unit 43 generates a control signal for the power converter 20 based on the output power $P_o$ and the output power command value $P_{oref}$. FIG. 4(a) shows drive signals for elements $M_1$ to $M_4$ as control signals. Assuming the phase shift control described above, a shift amount calculation unit 44 and a drive signal generator 45 are shown as the internal configuration of the control calculation unit 43. In other words, the control calculation unit 43 of the present embodiment has the shift amount calculation unit 44 and the drive signal generator 45.

The shift amount calculation unit 44 calculates the shift amount θ by a control calculation such as proportional/integral control (PI control). In this embodiment, the shift amount θ is calculated so that when the output power $P_o$ is smaller than the output power command value $P_{oref}$ ($P_o < P_{oref}$), the shift amount θ decreases, and when the output power $P_o$ is equal to or more than the output power command value $P_{oref}$ ($P_o \geq P_{oref}$), the shift amount θ increases. That is, the shift amount calculation unit 44 calculates the shift amount θ so that the output power $P_o$ remains constant. For example, as the main DC voltage $V_i$ increases due to braking of the electric vehicle, the shift amount θ also increases to keep the output power $P_o$ constant. The drive signal generator 45 generates drive signals for the elements $M_1$ to $M_4$ from the shift amount θ. This embodiment assumes that because the control response of the output power $P_o$ by the control calculation unit 43 is sufficiently high, the output power $P_o$ equals the output power command value $P_{oref}$.

The drive signal generator 45 of the control calculation unit 43 receives an enable signal (Enable in FIG. 4(a)) to control the operation or stop of the power converter 20. This enable signal is a digital signal generated inside the controller 40, and its logical level represents the operation or stop of the power converter 20. This configuration generates the drive signal so that the power converter 20 stops during acceleration, i.e., all elements $M_1$ to $M_4$ turn off.

(Operating Waveforms of Power Converter of the Present Embodiment)

Figure 5:
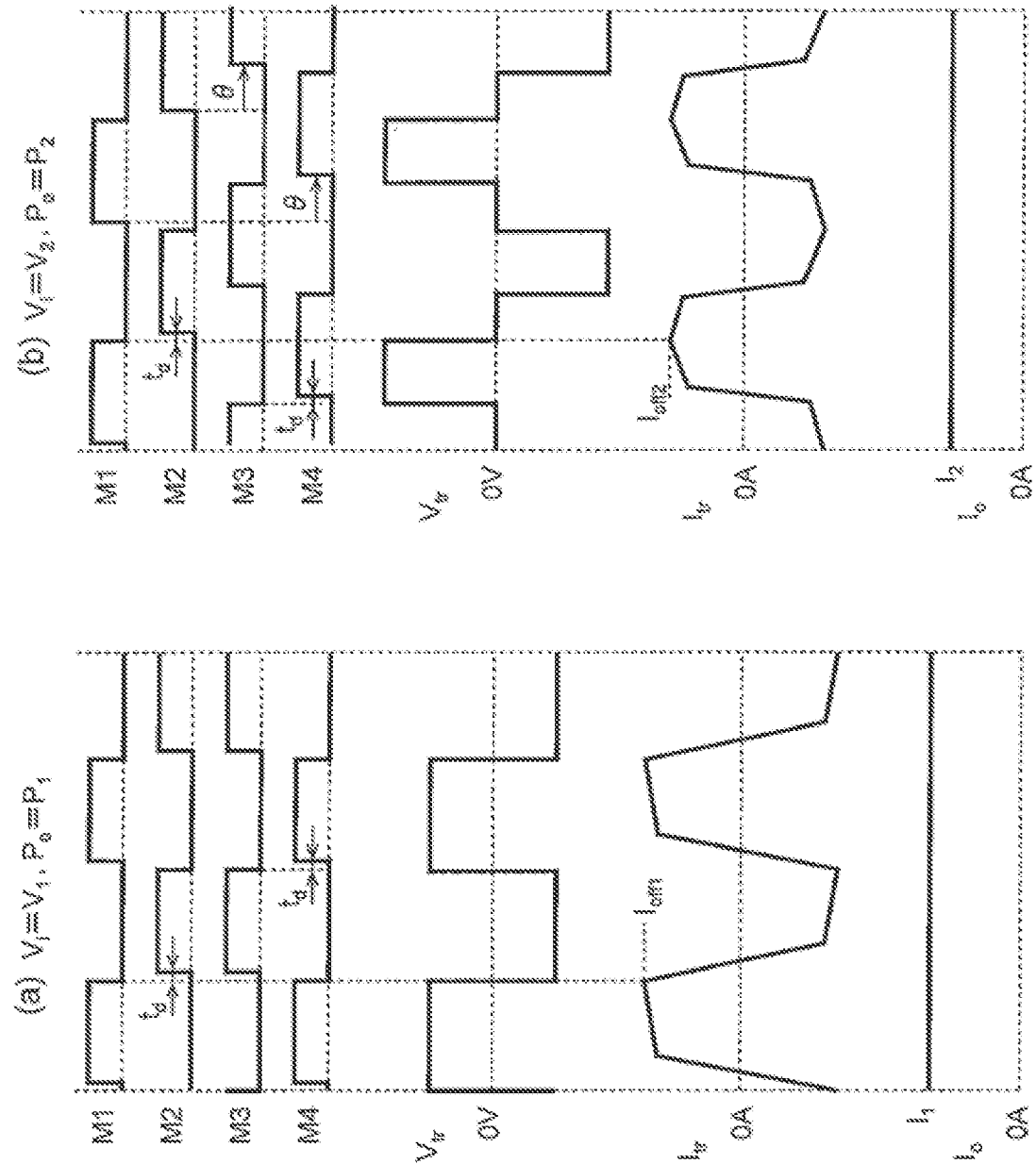
FIG. 5 shows the operating waveforms of the power converter in the present invention.

FIG. 5 shows the operating waveforms of the power converter 20 in the present embodiment. The descriptions in common with FIG. 3 will be omitted. FIG. 5(a) shows the example where the main DC voltage $V_i$ is the minimum value $V_1$ smaller than the threshold $V_c$, and the output power $P_o$ of the power converter 20 is controlled to the rated value $P_1$. FIG. 5(b) shows the example where the main DC voltage $V_i$ has a value $V_2$ larger than the threshold $V_c$, and the output power $P_o$ is controlled to a lower limit value $P_2$ that is smaller than the rated value $P_1$ due to the configuration described in FIG. 4. Note that since the conditions of the main DC voltage $V_i$ and the output power $P_o$ are the same in FIGS. 5(a) and 3(a), their operating waveforms are the same in these drawings. In FIG. 5(b), the output power $P_o$ is smaller than that in FIG. 5(a), so that the output current $I_o$ of the power converter 20 is also accordingly smaller. In FIG. 5(b), the value of the output current $I_o$ is 12 (=$P_2$/$V_o$<$I_1$).

As described referring to FIG. 3, the amplitude of the primary winding current $I_{tr}$ of the transformer 23 and the turn-off currents $I_{off1}$ and $I_{off2}$ of the element $M_1$ depend on the output current $I_o$. In FIG. 5(b), the output current $I_o$ is smaller than in FIG. 5(a), so that the amplitude of the primary winding current $I_{tr}$ and the turn-off current $I_{off2}$ are also smaller ($I_{off1}$>$I_{off2}$). Comparison between FIG. 3(b) and FIG. 5(b) also shows that the output current $I_o$, $I_{tr}$ amplitude, and turn-off current $I_{off2}$ are smaller in FIG. 5(b). From the above, the control to reduce the output power $P_o$ described in FIG. 4 reduces the turn-off loss of the elements under the condition of large main DC voltage $V_i$ and so reduces the resulting heat generation. Further, a larger reduction amount of the output power $P_o$, that is, the output current $I_o$ leads to a greater effect of reducing the heat generation of the power converter 20.

(Operation Timing Chart)

Figure 6:
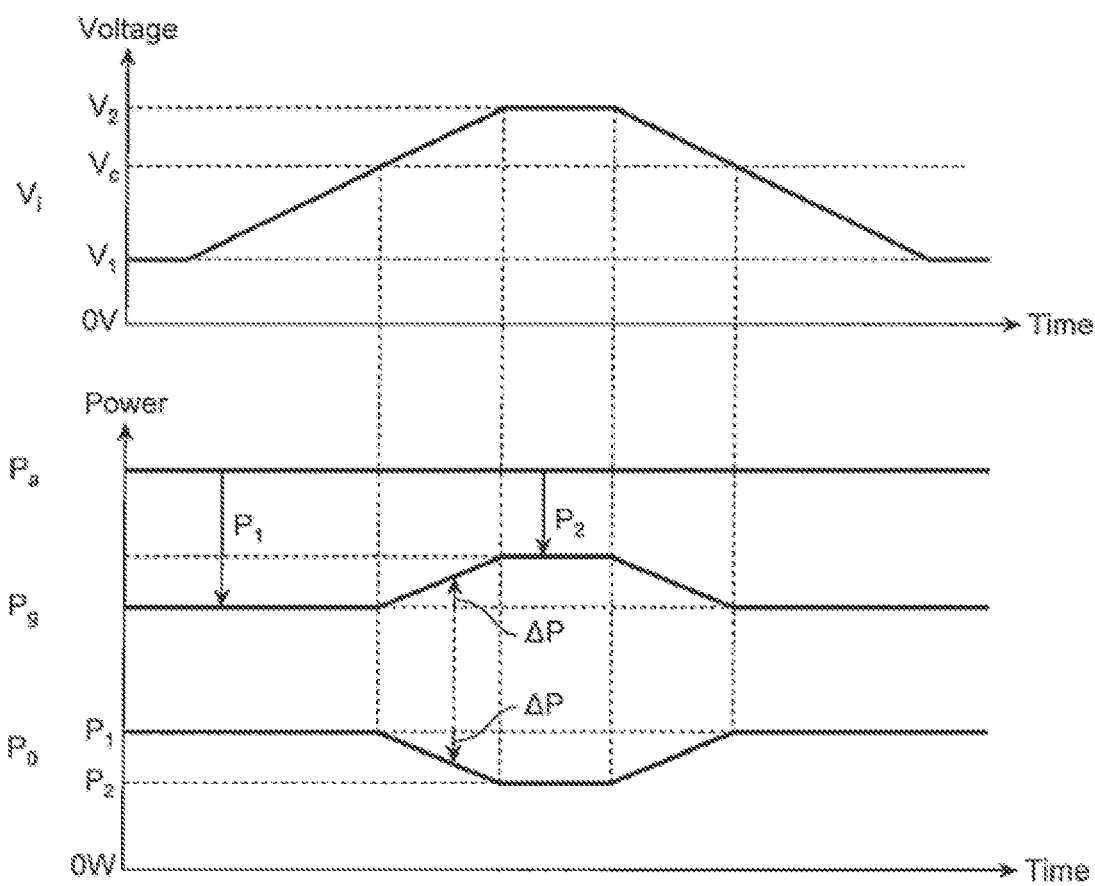
FIG. 6 is a timing chart in Embodiment 1.
Figure 7:
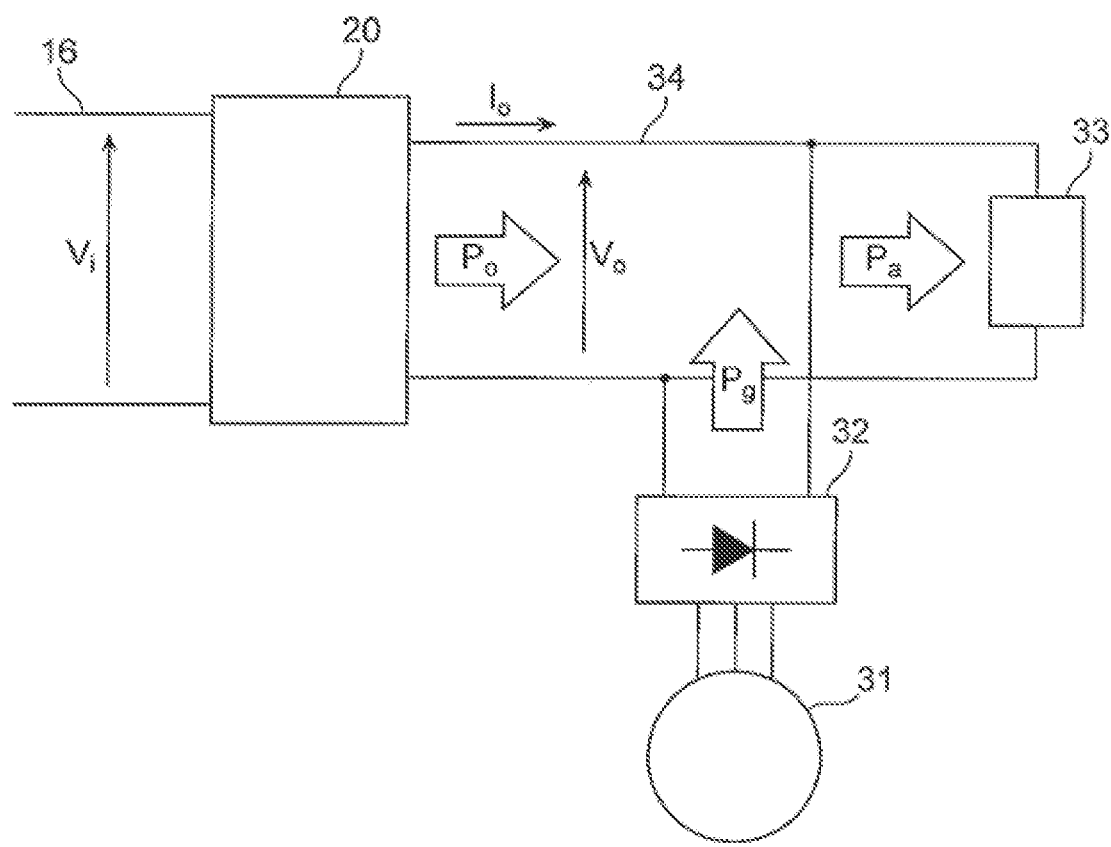
FIG. 7 defines device power in Embodiments 1 and 2.

FIG. 6 is a timing chart showing the power change of the devices when the main DC voltage $V_i$ fluctuates. Specifically, the drawing shows the output power $P_o$ of the power converter 20, the output power $P_g$ of the auxiliary generator 31, and the power consumption Pa of the auxiliary device 33. FIG. 7 shows only the devices related to FIG. 1 through FIG. 6, with the power defined by arrows. FIG. 7 shows the flow of power when the electric vehicle is braked, showing the case where the power converter 20 can output the power. As shown in FIG. 6, assume that the power consumption Pa of the auxiliary device 33 is constant and is larger than the output power $P_o$. In FIG. 7, the losses in the auxiliary rectifier circuit 32 are ignored, and the auxiliary output power $P_g$ is the power output from the auxiliary rectifier circuit 32 to the auxiliary DC line 34. FIG. 7 shows that, if the relationship $P_a$=$P_o$+$P_g$ is established and the power is balanced, the auxiliary DC voltage $V_o$ does not change and is stably fed to the auxiliary device 33.

The following focuses on the period during which the main DC voltage $V_i$ gradually increases from the minimum value $V_1$ to the maximum value $V_2$. The controller 40 controls the output power $P_o$ to the rated value $P_1$ when the main DC voltage $V_i$ is equal to or less than the threshold $V_c$ ($V_i$≤$V_c$). Since the power consumption Pa of the auxiliary device 33 is larger than the output power $P_o$ ($P_a$>$P_o$ (=$P_1$)), the auxiliary generator 31 outputs the difference to maintain the relationship $P_a$=$P_o$+$P_g$ and controls the auxiliary DC voltage $V_o$ to be constant. That is, $P_g$=$P_a$-$P_o$=$P_a$-$P_1$.

When the main DC voltage $V_i$ becomes larger than the threshold $V_c$ ($V_i$>$V_c$), the output power command value $P_{oref}$ is reduced to be smaller than the rated value $P_1$ with an increase of the main DC voltage $V_i$ according to the output power table 41 in FIG. 4. The output power $P_o$ therefore also gradually decreases as shown in FIG. 6. The auxiliary generator 31 gradually increases the auxiliary output power $P_g$ to control the auxiliary DC voltage $V_o$ to be constant. To control the output power $P_o$ of the power converter 20 to be smaller than the rated value $P_1$, the controller 40 controls the auxiliary generator 31 to increase the auxiliary output power $P_g$ of the auxiliary generator 31 by the amount of the decrease in the output power $P_o$ of the power converter 20.

As shown in FIG. 6, when the power converter 20 reduces the output power $P_o$ by ΔP from the rated value $P_1$, the auxiliary generator 31 increases the power by ΔP, so that the power $P_a$ supplied to the auxiliary device 33 is kept constant. When the main DC voltage $V_i$ reaches the maximum value $V_2$, the output power $P_o$ is controlled to the lower limit $P_2$, which is smaller than the rated value $P_1$. Then, $P_g$=$P_a$-$P_2$. Also for the period when the main DC voltage $V_i$ gradually decreases from the maximum value $V_2$ to the minimum value $V_1$, the powers change in the same manner. The detailed explanation is omitted.

ADVANTAGEOUS EFFECTS

As described above, Embodiment 1 provides the power converter 20 and the regenerative braking system including this to realize energy saving of the electric vehicle. This embodiment also copes with the input voltage fluctuations of the power converter 20 to reduce heat generation of the switching elements, especially when the input voltage is large. This is effective for extending the life of the elements and improving the long-term reliability. This also minimizes the cooling system and lowers the cost within the range of the temperature constraints of the elements. Embodiment 1 focuses on the turn-off loss as a heat generation factor of the elements. Reduction of the turn-off loss and of the resulting heat generation increases the switching frequency of the elements. This reduces the size of the transformer 23, the choke coil 25, and the capacitor 26 in the power converter 20, and lowers their cost.

(Supplementary Information)

Figure 8:
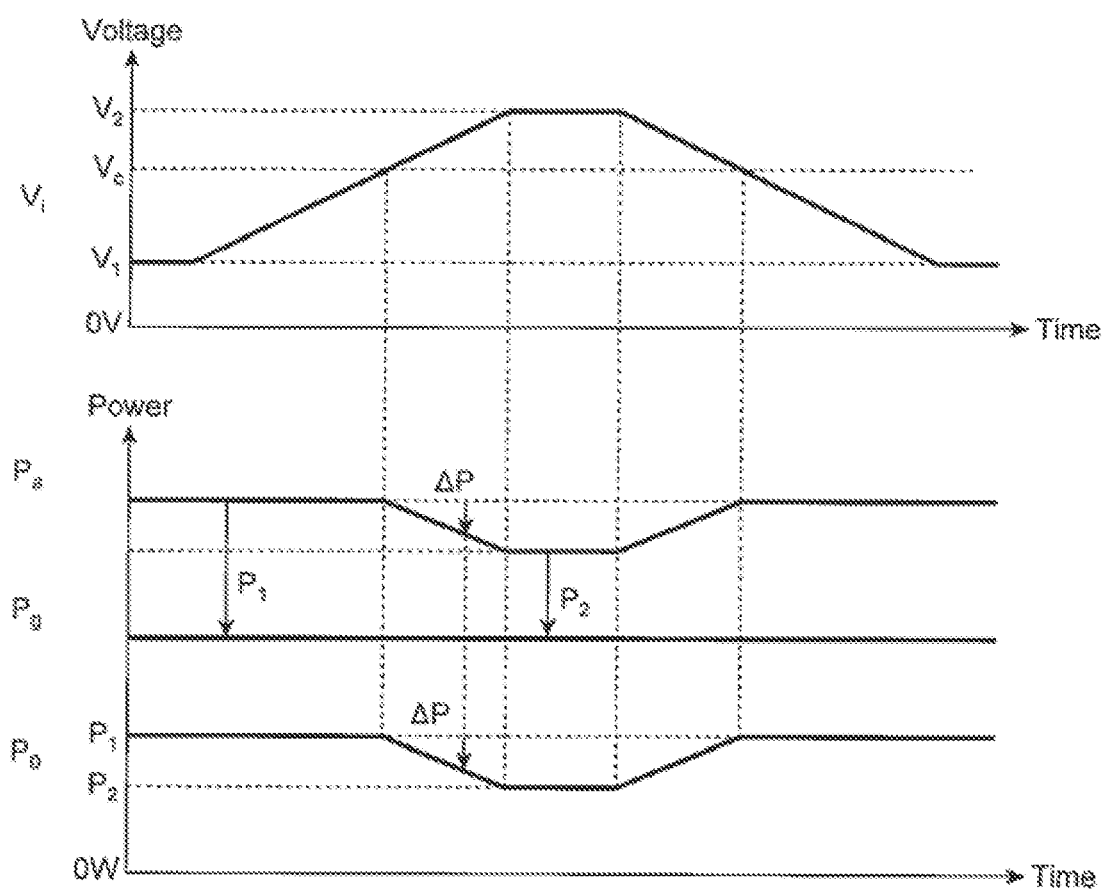
FIG. 8 is another example of timing chart in Embodiment 1.

The following describes supplementary information and other examples of Embodiment 1. FIG. 8 shows another example of the timing chart, in which power consumption control of the auxiliary device 33 is performed. The features in common with FIG. 6 are omitted. As shown in FIG. 1, the controller 40 is capable of controlling the power consumption $P_a$ of the auxiliary device 33. To control the output power $P_o$ of the power converter 20 to be smaller than the rated value $P_1$, the controller 40 decreases the power consumption $P_a$ of the auxiliary device 33 by the amount of the decrease in the output power $P_o$ of the power converter 20. In other words, to decrease the output power $P_o$ of the power converter 20 by ΔP, the controller 40 also reduces the power consumption $P_a$ by ΔP. This allows the auxiliary generator 31 to control the auxiliary DC voltage $V_o$ to constant without increasing the auxiliary output power $P_g$. When reducing the power consumption $P_a$, the power consumption of the auxiliary device such as an air conditioner, which does not significantly affect the running of the vehicle, may be reduced.

The supplemental information on the output power table 41 shown in FIG. 4(a) is as follows. When the output power $P_o$ is controlled to the rated value $P_1$ regardless of the value of the main DC voltage $V_i$, the turn-off loss of the elements and the resulting heat generation increase with the main DC voltage $V_i$. Therefore, as shown in the output power table 41 in FIG. 4(a), it is effective to, in the output reduction region where the main DC voltage $V_i$ is larger than the threshold $V_c$, control the output power $P_o$ to be smaller for a larger main DC voltage $V_i$ to increase the effect of heat generation reduction. When the main DC voltage $V_i$ is slightly larger than the threshold $V_c$, the reduction amount $\Delta P$ of the output power $P_o$ is reduced, so that the energy saving effect of the regenerative braking system can be enhanced. The output power table 41 of FIG. 4(a) is configured so that the output power $P_o$ is a linear function of the main DC voltage $V_i$ in the output reduction region. Alternatively, the output power $P_o$ may be inversely proportional to the main DC voltage $V_i$ in this region. When the turn-off loss is dominant as the heat generation factor of the elements and the heat generation is proportional to the main DC voltage $V_i$, the heat generation of the elements can be substantially constant in the output reduction region.

FIGS. 4(b) to 4(d) show other examples of the relationship between the main DC voltage $V_i$ and the output power command value $P_{oref}$ when the main DC voltage $V_i$ is larger than the threshold $V_c$ ($V_i > V_c$). FIG. 4(b) shows the hyperbolic function relationship ($P_{oref} = k/V_i$, $k = P_1 V_c$) in which the output power command value $P_{oref}$ decreases from the rated value $P_1$ in inverse proportion with the increase of the main DC voltage $V_i$ from the threshold $V_c$. FIG. 4(c) shows the case where the rate of decreasing the output power command value $P_{oref}$ increases in a quadratic manner with the increase of the main DC voltage $V_i$ from the threshold $V_c$. FIG. 4(d) shows the case where the output power command value $P_{oref}$ changes stepwise from the rated output power $P_1$ to a smaller value with the increase of the main DC voltage $V_i$ from the threshold $V_c$.

Embodiment 2

(Block Diagram of Controller)

Figure 9:
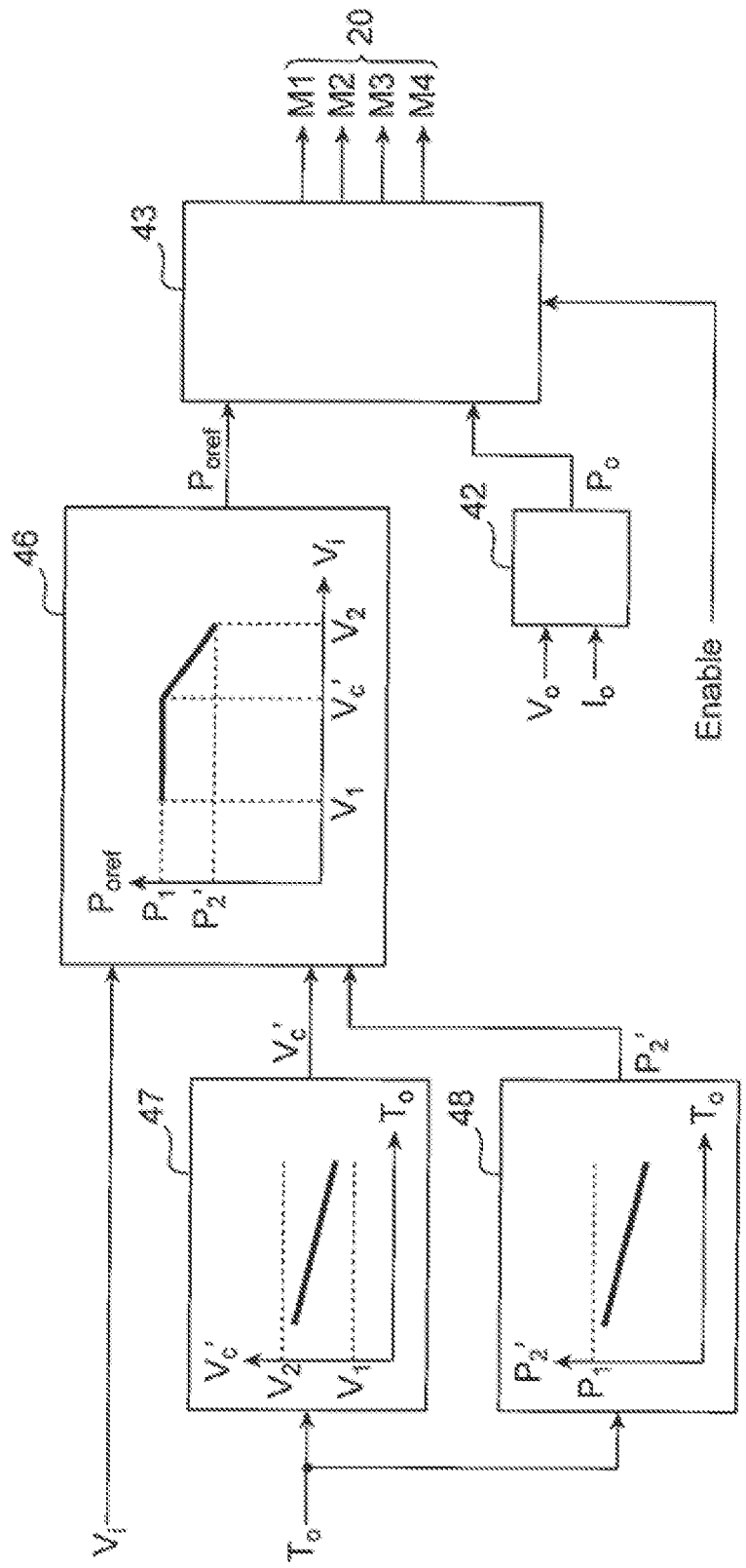
FIG. 9 is a block diagram showing the part of the controller in Embodiment 2 that controls the power converter.

Similarly to Embodiment 1, Embodiment 2 of the present invention uses the electric drive system shown in FIG. 1. Embodiment 2 is different from Embodiment 1 in the internal configuration (block diagram) of the controller 40. Embodiment 2 controls the output power $P_o$ of the power converter 20 using the temperature $T_o$ of the power converter 20, which is detected by the temperature detector 27. FIG. 9 is a block diagram showing the part of the controller 40 in Embodiment 2 that controls the power converter 20. The output power calculation unit 42 and the control calculation unit 43 are the same as those in FIG. 4 (Embodiment 1), description thereof will be omitted.

The controller 40 in Embodiment 2 includes an output power table 46. Similarly to the output power table 41 of FIG. 4(a) (Embodiment 1), the output power table 46 creates an output power command value $P_{oref}$ of the power converter 20 based on the main DC voltage $V_i$. The output power table 41 uses the threshold $V_c$ (threshold related to the main DC voltage $V_i$) and the lower limit value $P_2$ (output power command value $P_{oref}$ under the condition where the main DC voltage $V_i$ is the maximum value $V_2$) as two internal parameters. The output power table 46 of FIG. 9 (Embodiment 2) uses a threshold $V_c'$ (first threshold) instead of the threshold $V_c$, and the lower limit value $P_2'$ instead of the lower limit value $P_2$. These parameters change with the temperature $T_o$ of the power converter 20 as described later.

The controller 40 of Embodiment 2 has a threshold table 47 that creates a threshold $V_c'$ based on the temperature $T_o$ of the power converter 20, and an output lower limit table 48 that creates a lower limit value $P_2'$ based on the temperature $T_o$. The threshold table 47 decreases the threshold $V_c'$ with an increase of the temperature $T_o$. The output lower limit table 48 decreases the lower limit $P_2'$ with an increase of the temperature $T_o$. Under the same main DC voltage $V_i$ condition and when the main DC voltage $V_i$ is larger than the threshold $V_c'$ ($V_i > V_c'$), the output power command value $P_{oref}$ decreases with an increase of the temperature $T_o$. This embodiment increases the effect of reducing heat generation of the elements described in Embodiment 1 for a higher temperature $T_o$. In other words, when the temperature $T_o$ is low and the temperature of the elements has a margin, the reduction of the output power $P_o$ can be reduced to enhance the energy saving effect of the regenerative braking system.

Note that either the threshold table 47 or the output lower limit table 48 may not be used. For example, when the output lower limit table 48 is not used, the output power $P_o$ is set as a linear function of the main DC voltage $V_i$ in the output reduction region, and its slope is made constant regardless of the temperature $T_o$. With this configuration, even without the output lower limit table 48, the output power command value $P_{oref}$ under the condition where the main DC voltage $V_i$ is the maximum value $V_2$ decreases with an increase of the temperature $T_o$. The same applies to the case where the output power $P_o$ is inversely proportional to the main DC voltage $V_i$ in the output reduction region.

Embodiment 3

(Hardware Configuration of Electric Drive System)

Figure 10:
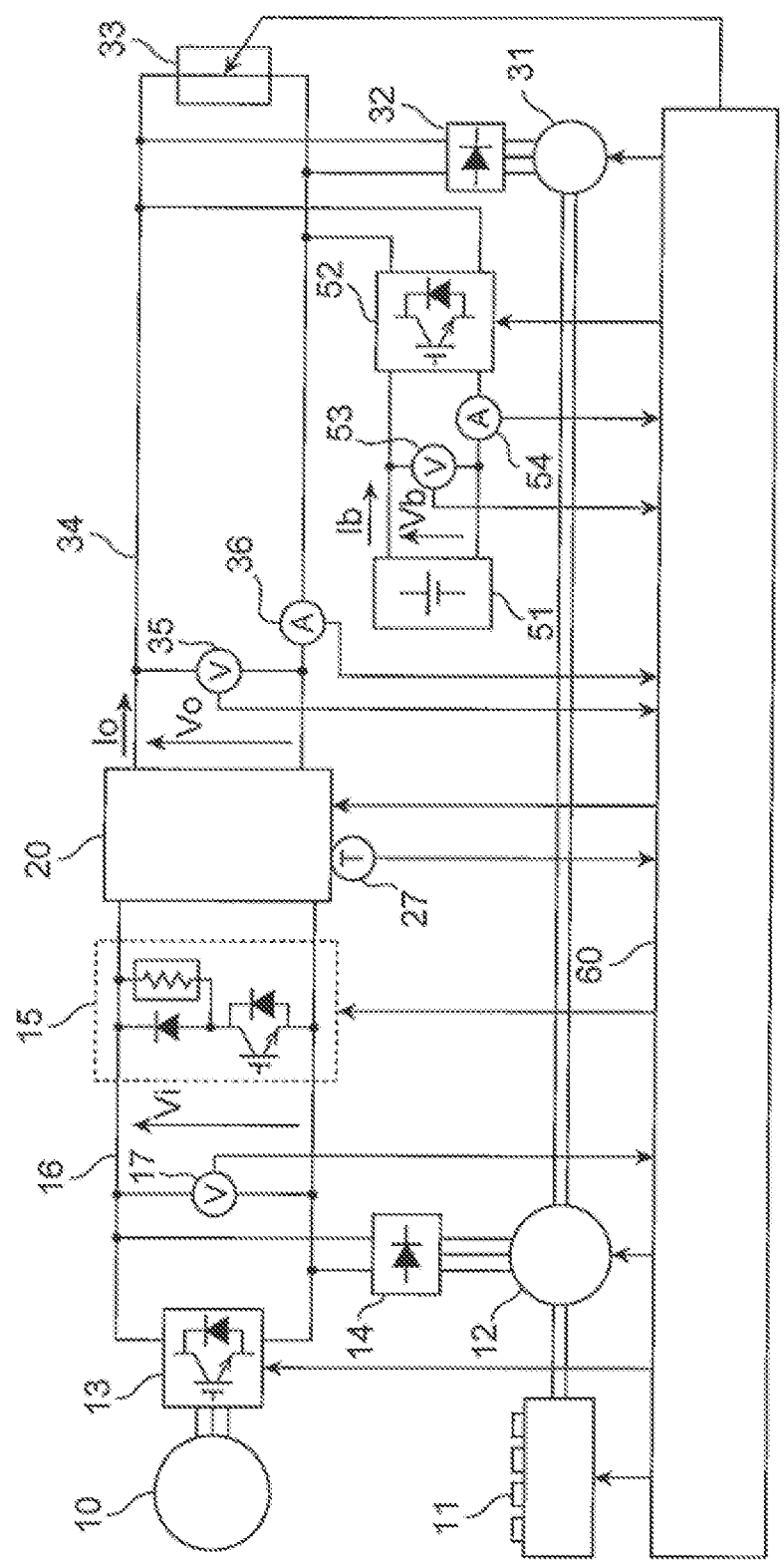
FIG. 10 shows a hardware configuration of an electric drive system of an electric vehicle according to Embodiment 3.

Referring to FIG. 10, the following describes a hardware configuration of the electric drive system in Embodiment 3. The features in common with FIG. 1 (Embodiment 1 or 2) are omitted.

The electric drive system of FIG. 10 (Embodiment 3) has a storage device 51 and its charger/discharger 52 that are connected to the auxiliary DC line 34. This system has a voltage detector 53 that detects the voltage $V_b$ (third DC voltage) of the storage device 51 and a current detector 54 that detects the charge/discharge current $I_b$ of the storage device 51. The storage device 51 is connected to the input of the charger/discharger 52 via the current detector 54. The output of the charger/discharger 52 is connected to the auxiliary DC line 34. The storage device 51 and its charger/discharger 52 make up the electrical load of the electric drive system.

Examples of the storage device 51 include batteries such as a nickel hydrogen battery and a lithium ion battery, and capacitors such as an electric double layer capacitor and a lithium ion capacitor. The charger/discharger 52 is a DC/DC converter enabling bidirectional operation, and charges the storage device 51 by transmitting power from the output side to the input side, and discharges power of the storage device 51 by transmitting the power from the input side to the output side. A bidirectional chopper circuit can be the circuit scheme for the charger/discharger 52, which may be other schemes.

FIG. 10 assumes an IGBT as the switching element of the charger/discharger 52, and indicates it with the circuit symbol for IGBT. Other types of elements such as a MOSFET may be used. The positive/negative polarity of the charge/discharge current $I_b$ of the storage device 51 is defined so that the charge/discharge current $I_b$ becomes positive when the storage device 51 discharges. The charge/discharge power of the storage device 51, $P_b = V_b I_b$, is also positive when the storage device 51 discharges.

The electric drive system in FIG. 10 (Embodiment 3) includes a controller 60. The controller 60 is different from the controller 40 in FIG. 1 (Embodiment 1 or 2) in that it acquires information on the voltage $V_b$ of the storage device 51 from the voltage detector 53 and acquires information on the charge/discharge current $I_b$ from the current detector 54. The controller 60 outputs a control signal to the charger/discharger 52. In FIG. 10, the control signal from the controller 60 to the charger/discharger 52 is indicated with a single arrow. In another example, the charger/discharger 52 may include a plurality of elements. In that case, the signal also may be a plurality of control signals. In this way, the embodiment having the storage device 51 allows a part of the output power $P_o$ of the power converter 20 to be stored in the storage device 51 and be used during acceleration of the vehicle, for example.

(Block Diagram of Controller)

Figure 11:
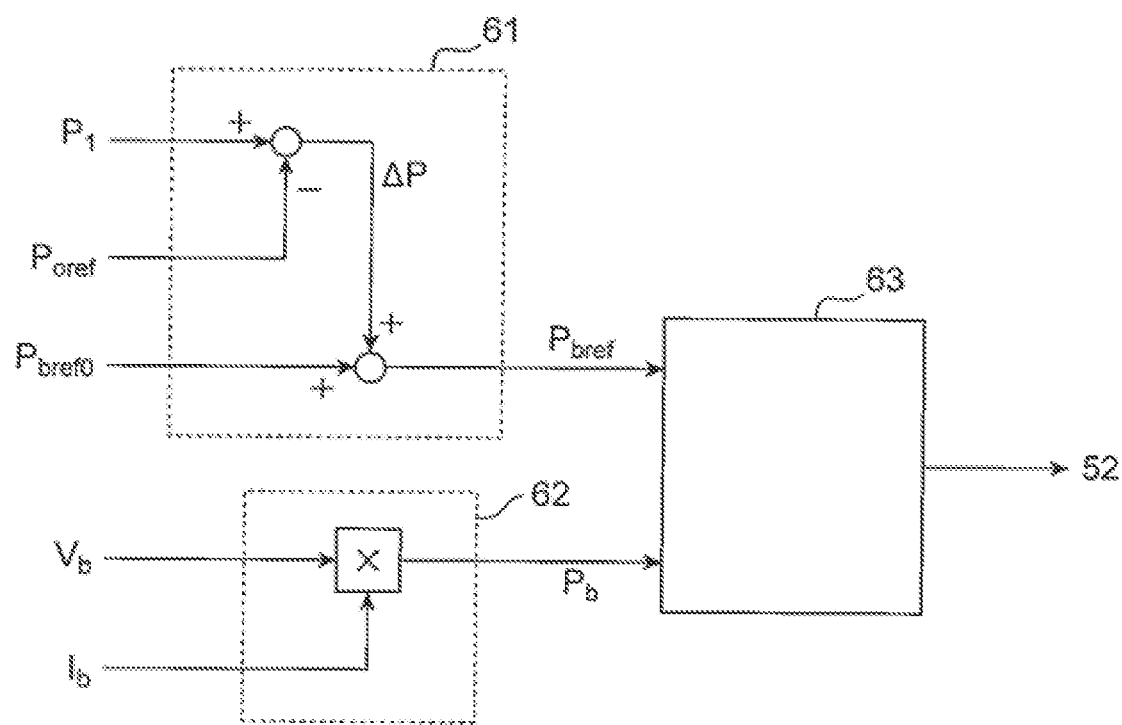
FIG. 11 is a block diagram showing the part of the controller in Embodiment 3 that controls the charger/discharger.

FIG. 11 is a block diagram showing the part of the controller 60 that controls the charger/discharger 52. The controller 60 includes a charge/discharge command correction unit 61, a charge/discharge power calculation unit 62, and a control calculation unit 63.

The charge/discharge command correction unit 61 receives inputs from the power converter 20 that are the output power command value $P_{oref}$ and the charge/discharge command value $P_{bref0}$ before correction. The output power command value $P_{oref}$ is created in the same way as in Embodiment 1 or 2. For example, it is generated with the output power table shown in FIG. 4(*a*) or FIG. 9. The following describes an example where the output power command value $P_{oref}$ is created with the output power table 41 in FIG. 4(*a*) (Embodiment 1) and is input to the charge/discharge command correction unit 61. The charge/discharge command value $P_{bref0}$ before correction is created by a higher-order system than the block diagram of FIG. 11, and is input to the charge/discharge command correction unit 61.

The charge/discharge command correction unit 61 calculates a reduction amount $\Delta P$ of the output power $P_o$ from the output power command value $P_{oref}$ and its rated value $P_1$. In the output restriction region ($V_i > V_c$), the reduction $\Delta P$ is larger than 0 ($\Delta P > 0$). If the main DC voltage $V_i$ is equal to or less than the threshold $V_c$ ($V_i \leq V_c$), the reduction $\Delta P$ is 0 ($\Delta P = 0$). The charge/discharge command correction unit 61 adds the charge/discharge command value $P_{bref0}$ before correction and the reduction $\Delta P$ to calculate a corrected charge/discharge command value $P_{bref}$. If it is the discharge state before correction, i.e., $P_{bref0} > 0$, the discharge power will be even larger due to the addition described above.

In contrast, if it is in the charge state before correction, i.e., the charge/discharge command value $P_{bref0}$ before correction is smaller than 0 ($P_{bref0} < 0$), and if $|P_{bref0}| \geq \Delta P$ (if the charge power is larger than the reduction $\Delta P$), the charge power will be smaller by the addition described above. Even if it is in a charge state before correction, and if $|P_{bref0}| < \Delta P$ (the charge power is smaller than the reduction $\Delta P$), the charger/discharger 52 discharges the storage device 51 by the addition described above. In either case, the charge/discharge command correction unit 61 corrects the charge/discharge command value of the charger/discharger 52 so as to suppress fluctuations in the power supplied to the auxiliary DC line 34 when reducing the output power of the power converter 20.

The charge/discharge power calculation unit 62 calculates the charge/discharge power $P_b (= V_b I_b)$ from the voltage $V_b$ and the charge/discharge current $I_b$ of the storage device 51. The control calculation unit 63 generates a control signal for the charger/discharger based on the charge/discharge power $P_b$ and the corrected charge/discharge command value $P_{bref0}$. The present embodiment assumes that the control response of the charge/discharge power $P_b$ by the control calculation unit 63 is sufficiently high, and the charge/discharge power $P_b$ equals the corrected charge/discharge command value $P_{bref0}$.

(Operation Timing Chart)

Figure 12:
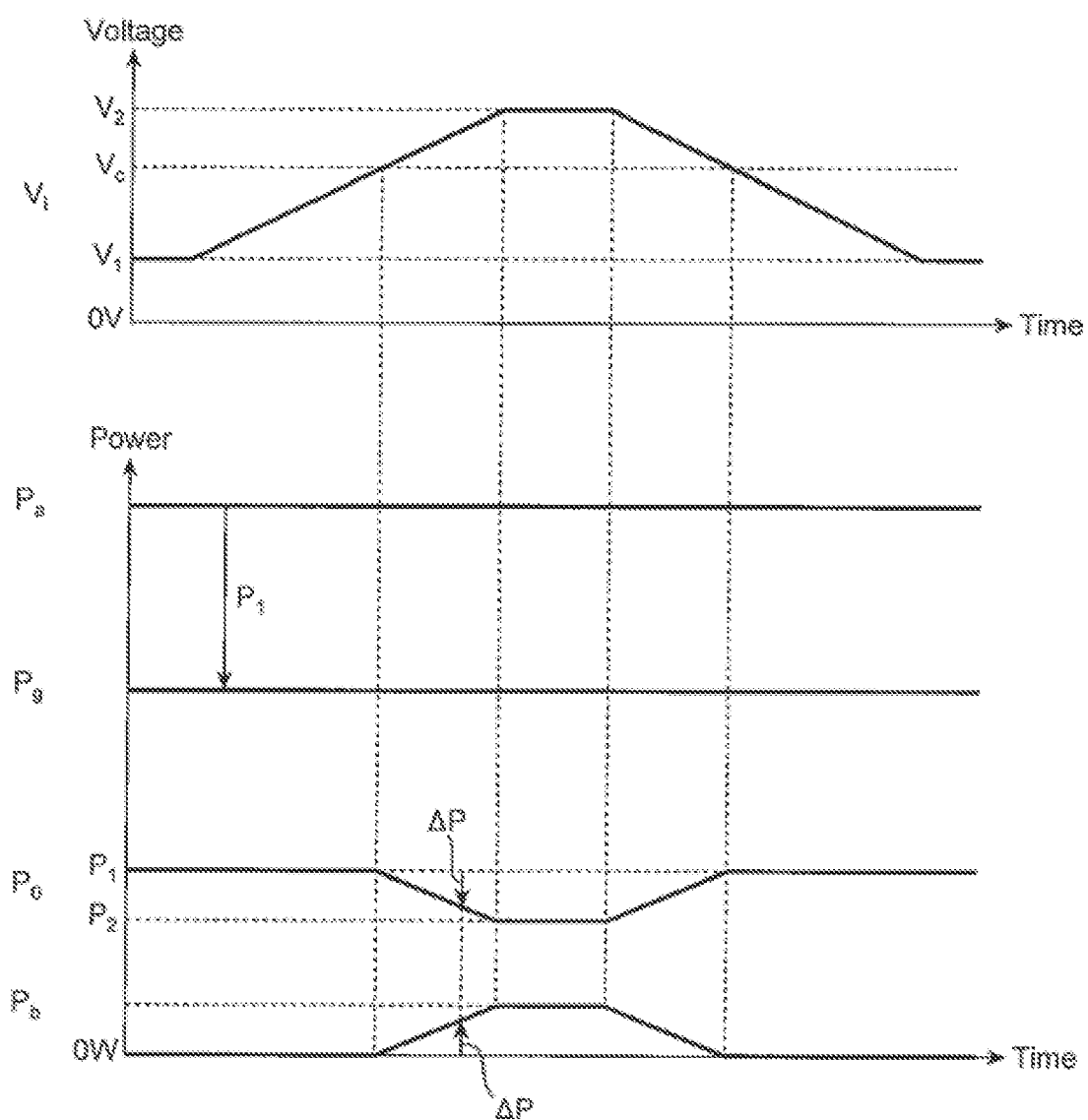
FIG. 12 is a timing chart in Embodiment 3.
Figure 13:
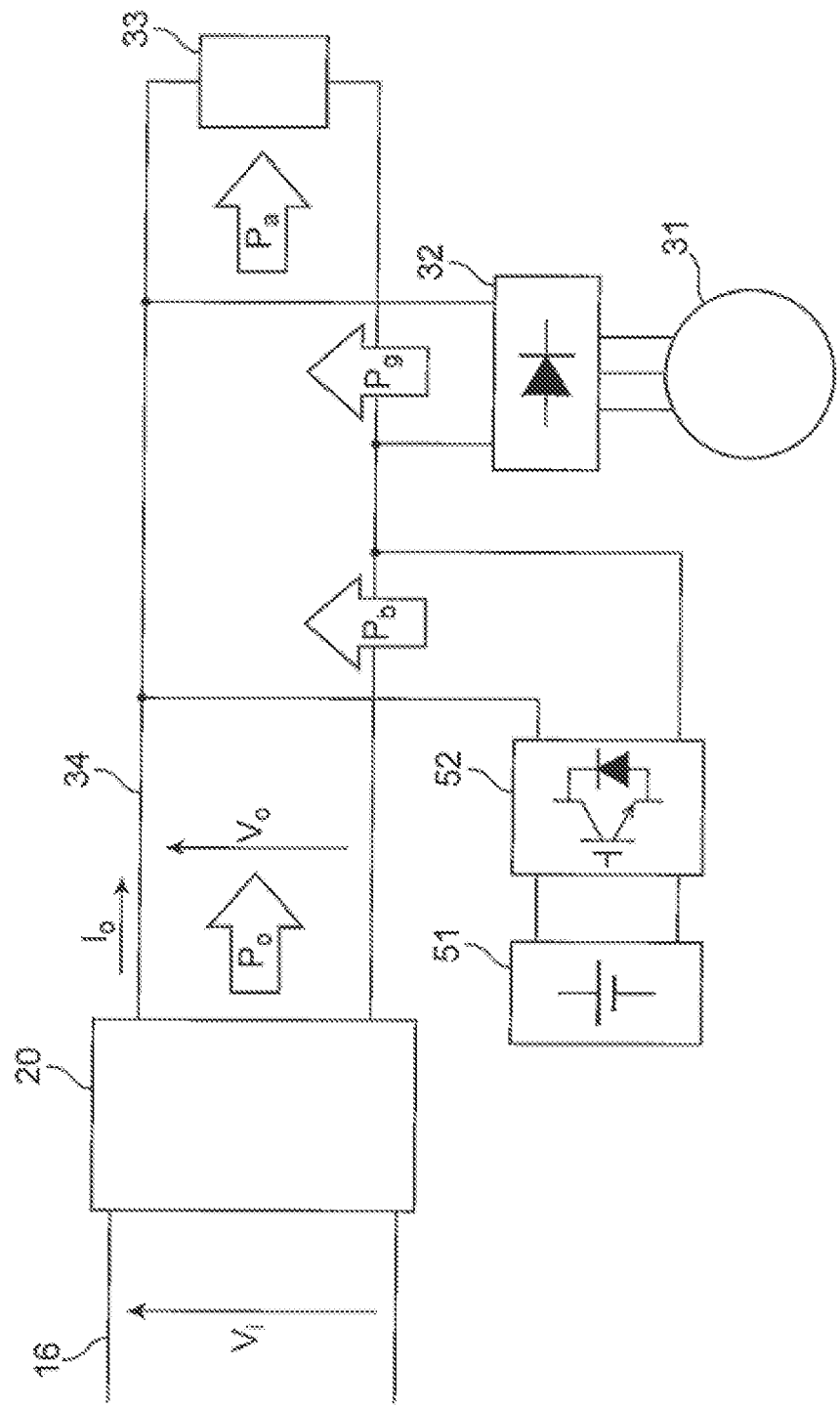
FIG. 13 defines device power in Embodiment 3.

FIG. 12 is a timing chart showing the power change of the devices when the main DC voltage $V_i$ fluctuates. As compared with FIGS. 6 and 8, FIG. 12 shows charge/discharge power $P_b$ of the storage device 51 in addition to the output power $P_o$ of the power converter 20, the auxiliary output power $P_g$ of the auxiliary generator 31, and the power consumption $P_a$ of the auxiliary device 33. FIG. 13 shows only the devices related to FIG. 10 through FIG. 12, with the power defined by arrows.

FIG. 13 shows the flow of power when the electric vehicle is braked, showing the case where the power converter 20 can output the power. As shown in FIG. 12, assume that the power consumption $P_a$ of the auxiliary device 33 is constant and is larger than the output power $P_o$. Assume also that the charge/discharge command value $P_{bref0}$ before correction shown in FIG. 11 is zero and that the charger/discharger 52 neither charges nor discharges when the output power of the power converter 20 is not reduced. In FIG. 13, the losses in the charger/discharger 52 are ignored, and the power that the charger/discharger 52 outputs to the auxiliary DC line 34 is the charge/discharge power $P_b$. As shown in FIG. 13, if the relationship $P_a = P_o + P_g + P_b$ is established and the power is balanced, the auxiliary DC voltage $V_o$ does not change.

In FIG. 12, during the period when the main DC voltage $V_i$ is equal to or less than the threshold $V_c$ ($V_i \leq V_c$), the output power of the power converter 20 is not reduced, and the output power $P_o$ is controlled to the rated value $P_1$. Further, based on the assumptions described above, the charge/discharge power $P_b$ is controlled to zero. Summarizing the above, $P_o = P_1$ and $P_b = 0$ hold. At this time, the above equation for power balance will be $P_a = P_1 + P_g$. Since $P_a > P_1$ as shown in FIG. 12, the auxiliary generator 31 outputs the difference, i.e., $P_g = P_a - P_1$, to maintain the power balance and keep the auxiliary DC voltage $V_o$ constant.

When the main DC voltage $V_i$ becomes larger than the threshold $V_c$, i.e., $V_i > V_c$ (output reduction region), the output power command value $P_{oref}$ is reduced according to the output power table 41 in FIG. 4(*a*), so that the output power $P_o$ gradually decreases as shown in FIG. 12. The reduction $\Delta P$ of the output power $P_o$ gradually increases. Since $P_{bref0} = 0$ as described above, the charge/discharge command correction unit 61 in FIG. 11 uses the corrected charge/discharge command value $P_{bref0}$ as the reduction $\Delta P$. Therefore, the charge/discharge power $P_b$ gradually increases as shown in FIG. 12.

Summarizing the above, $P_o = P_1 - \Delta P$ and $P_b = \Delta P$ hold. Substituting these into the power balance relational expression, $P_g = P_a - P_1$ holds regardless of $\Delta P$. That is, the power balance is maintained without changing the auxiliary output power $P_g$ from $P_a - P_1$ by the auxiliary generator 31, and the auxiliary DC voltage $V_o$ and the power supplied to the auxiliary device 33 are kept constant. When the main DC voltage $V_i$ reaches the maximum value $V_2$ ($V_i = V_2$), the output power $P_o$ is controlled to the lower limit $P_2$ ($P_o = P_2$), so that $\Delta P = P_1 - P_2$. Further, $P_b = \Delta P = P_1 - P_2$. For the period when the main DC voltage $V_i$ gradually decreases from the maximum value $V_2$ to the minimum value $V_1$, the powers change in the same manner. The detailed explanation is omitted.

Embodiment 1 shows the configuration in which the auxiliary generator 31 increases its output to compensate for the reduced output of the power converter 20, and supplies a constant amount of power to the auxiliary device 33. However, if the main DC voltage $V_i$ changes suddenly, the control of the auxiliary generator 31 cannot follow, and the auxiliary DC voltage $V_o$ temporarily decreases. To cope with this problem, a method of connecting a large-capacity smoothing capacitor to the auxiliary DC line 34 can be used. This method, however, has the problem that the system becomes larger and more expensive due to the smoothing capacitor. In contrast, Embodiment 3 is configured so that, instead of the auxiliary generator 31, the storage device 51 and the charger/discharger 52 compensate for the reduced output of the power converter 20. Since the power density of the storage device 51 is improving year by year, the storage device 51 controls the output faster than the auxiliary generator 31. This makes it possible to control the auxiliary DC voltage $V_o$ to a constant level even when the main DC voltage $V_i$ changes suddenly.

(Appearance of Dump Truck)

FIG. 14 describes a basic configuration of a dump track that is common to all the embodiments. The dump truck has a body 5 for loading earth and sand, for example, on a frame 1, and the body 5 and the frame 1 are connected by a hoist cylinder 6. To the frame 1, front wheels 2, rear wheels 3, a fuel tank 9, and the like are attached via mechanical parts (not shown). The rotating shaft of the rear wheels 3 contains a driving motor 10 for driving the rear wheels 3 and a decelerator for adjusting the rotation speed of the rear wheels 3. The frame 1 also has a deck attached so as to allow an operator to walk thereon. The deck includes a cab 4 for operators to board and operate the dump truck, a control cabinet 8 containing various electric power devices, and a plurality of grid boxes 7 for dissipating excess energy as heat. The resistors of the power consumption device 15 shown in FIGS. 1 and 10 are housed in the grid box 7. The part hidden by the front wheels 2 in FIG. 14 houses the engine, the main generator that functions mainly as a power source for driving motor, the auxiliary generator that functions mainly as a power source for auxiliary devices, and a main pump (not shown) mainly as a hydraulic source for hydraulic equipment.

Next, the following describes how the operator operates the dump truck. In the cab 4, an accelerator pedal, a brake pedal, a hoist pedal, and a steering wheel, not shown, are installed. The operator can control the acceleration force and braking force of the dump truck with the amount of depression of the accelerator pedal and the amount of depression of the brake pedal in the cab 4. The operator also performs the steering operation with hydraulic drive by rotating the steering wheel left and right, and performs the dump operation with hydraulic drive by depressing the hoist pedal. The system for the steering operation and the dump operation of the present invention are the same as in the conventional techniques, and they will not be described in detail.

That is a detailed description of the embodiments of the present invention. The present invention is not limited to the above-stated embodiments, and the design may be modified variously without departing from the spirits of the present invention. For instance, the entire detailed configuration of the embodiments described above for explanatory convenience is not always necessary for the present invention. A part of one embodiment may be replaced with the configuration of another embodiment, or the configuration of one embodiment may be added to the configuration of another embodiment. A part of the configuration of each embodiment may include another configuration that is added, or may be deleted or replaced with another configuration.

REFERENCE SIGNS LIST

1 Frame
2 Front wheel
3 Rear wheel
4 Cab
5 Body
6 Hoist cylinder
7 Grid box
8 Control Cabinet
9 Fuel tank
10 Driving motor
11 Engine
12 Main generator (first generator)
13 Inverter (first inverter)
14 Main rectifier circuit (first rectifier circuit)
15 Power consumption device
16 Main DC line (first DC line)
17, 35, 53 Voltage detector
0 Power converter
21 Inverter (second inverter)
22, 26 Capacitor
23 Transformer
24 Rectifier circuit (third rectifier circuit)
25 Choke coil
27 Temperature detector
31 Auxiliary generator (second generator)
32 Auxiliary rectifier circuit (second rectifier circuit)
33 Auxiliary device
34 Auxiliary DC line (second DC line)
36, 54 Current detector
40, 60 Controller
41, 46 Output power table
42 Output power calculation unit
43, 63 Control calculation unit
44 Shift amount calculation unit
45 Drive signal generator
47 Threshold table
48 Output lower limit table
51 Storage Device
52 Charger/discharger
61 Charge/discharge command correction unit
62 Charge/discharge power calculation unit
$M_1$ to $M_4$ Switching element
$V_i$ Main DC voltage
$V_c$ Threshold
$P_1$ Rated value (rated power)
$P_2$ Lower limit value
$P_{oref}$ Output power command value
θShift amount

The invention claimed is:

1. An electric vehicle comprising:
an engine;
a first generator driven by the engine;
a first rectifier circuit connected to the output of the first generator;
a first DC line to receive the DC output of the first rectifier circuit;
a driving motor connected to the first DC line;
a power converter configured to convert voltage of the first DC line;
a second DC line to receive the DC output subjected to voltage conversion by the power converter;
an auxiliary device connected to the second DC line;

a controller configured to control the power converter; and a temperature detector that is mounted around the power converter, wherein in response to the voltage of the first DC line becoming equal to or less than a first threshold, the controller controlling output power of the power converter to a preset rated power, in response to the voltage of the first DC line becoming larger than the first threshold, the controller controlling output power of the power converter to be smaller than the rated power, and the controller is configured to detect a temperature of the power converter using the temperature detector and is configured to reduce a value of the first threshold when an increase in temperature of the power converter is detected.

2. The electric vehicle according to claim 1, wherein the controller is configured to, in a region where the voltage of the first DC line is larger than the first threshold, control to reduce the output power of the power converter with an increase of the voltage of the first DC line.

3. The electric vehicle according to claim 1, wherein the controller is configured to control power consumption of the auxiliary device to reduce the output power of the power converter to be smaller than the rated power, so as to reduce the power consumption of the auxiliary device by an amount corresponding to the reduced output power of the power converter.

4. The electric vehicle according to claim 1, further comprising: a second generator driven by the engine; and a second rectifier circuit connected to the output of the second generator, wherein the DC output of the second rectifier circuit is input to the second DC line, and the controller is configured to control the output of the second generator and control the output power of the power converter to be smaller than the rated power, so as to increase the output of the second generator by an amount of the reduced output power of the power converter.

5. The electric vehicle according to claim 1, further comprising a charger/discharger connected to the second DC line, and a storage device configured so that the charger/discharger charges and discharges the storage device, wherein the controller is configured to control charge/discharge power of the storage device by the charger/discharger and reduce the output power of the power converter to be smaller than the rated power, so as to increase charged power from the charger/discharger by an amount corresponding to the reduced output power of the power converter.

* * * * *